(12) United States Patent
Hoffmann et al.

(10) Patent No.: US 9,926,907 B2
(45) Date of Patent: Mar. 27, 2018

(54) METHOD FOR MOUNTING A WIND TURBINE ROTOR BLADE, AND WIND TURBINE ROTOR BLADE

(71) Applicant: Wobben Properties GmbH, Aurich (DE)

(72) Inventors: Alexander Hoffmann, Emden (DE); Frank Knoop, Aurich (DE); Gerrit Kuiper, Aurich (DE)

(73) Assignee: Wobben Properties GmbH, Aurich (DE)

( * ) Notice: Subject to any disclaimer, the term of this patent is extended or adjusted under 35 U.S.C. 154(b) by 283 days.

(21) Appl. No.: 14/900,020

(22) PCT Filed: Jun. 18, 2014

(86) PCT No.: PCT/EP2014/062880
§ 371 (c)(1),
(2) Date: Dec. 18, 2015

(87) PCT Pub. No.: WO2014/202691
PCT Pub. Date: Dec. 24, 2014

(65) Prior Publication Data
US 2016/0138561 A1    May 19, 2016

(30) Foreign Application Priority Data
Jun. 21, 2013   (DE) .................. 10 2013 211 751

(51) Int. Cl.
*F03D 1/06* (2006.01)
*B66C 1/10* (2006.01)
*F03D 13/10* (2016.01)

(52) U.S. Cl.
CPC ............ *F03D 1/0675* (2013.01); *B66C 1/108* (2013.01); *F03D 1/0658* (2013.01); *F03D 13/10* (2016.05); *F05B 2230/61* (2013.01); *Y02E 10/721* (2013.01)

(58) Field of Classification Search
CPC ...... F03D 1/0675; F03D 1/0658; F03D 13/10; F05B 2230/61; B66C 1/108; B66C 15/02
See application file for complete search history.

(56) References Cited

U.S. PATENT DOCUMENTS

| | | |
|---|---|---|
| 7,207,777 B2 | 4/2007 | Bervang |
| 7,353,603 B2 | 4/2008 | Wobben |
| 7,748,961 B2 | 7/2010 | Wobben |
| 7,832,987 B2 | 11/2010 | Haarh et al. |

(Continued)

FOREIGN PATENT DOCUMENTS

| | | |
|---|---|---|
| CN | 1688808 A | 10/2005 |
| DE | 10225025 A1 | 12/2003 |

(Continued)

*Primary Examiner* — Ninh H Nguyen
(74) *Attorney, Agent, or Firm* — Seed Intellectual Property Law Group LLP

(57) ABSTRACT

A method for mounting a wind turbine rotor blade which has at least one release unit is provided. A hoisting rope is fastened on or in the rotor blade. First ends of at least one auxiliary rope are fastened on or in the release unit in the rotor blade. The rotor blade is lifted up by means of the hoisting rope. The rotor blade is mounted on a rotor of the wind turbine. The release unit is activated so that the first ends of the auxiliary ropes are released. The auxiliary ropes can be removed.

10 Claims, 3 Drawing Sheets

(56) References Cited

U.S. PATENT DOCUMENTS

| | | |
|---|---|---|
| 7,883,319 B2 | 2/2011 | Volkmer |
| 8,083,212 B2 | 12/2011 | Numajiri et al. |
| 8,191,721 B2 * | 6/2012 | Hansen .................. B66C 1/108 212/273 |
| 8,601,688 B2 * | 12/2013 | Lynderup ................ B66C 1/108 29/889 |
| 2010/0254813 A1 * | 10/2010 | Dawson ................ B66C 23/207 416/146 R |
| 2011/0057158 A1 | 3/2011 | Von Kessel et al. |
| 2011/0094987 A1 * | 4/2011 | Botwright ............... B66C 1/108 212/274 |
| 2012/0027561 A1 | 2/2012 | Riddell et al. |
| 2013/0236324 A1 | 9/2013 | Bech et al. |
| 2014/0127025 A1 | 5/2014 | Hoffmann |
| 2014/0245580 A1 | 9/2014 | Meyer et al. |

FOREIGN PATENT DOCUMENTS

| | | |
|---|---|---|
| DE | 10305543 A1 | 8/2004 |
| DE | 102007043426 A1 | 3/2009 |
| DE | 202010002679 U1 | 7/2010 |
| DE | 202010003033 U1 | 7/2010 |
| DE | 102011076937 B3 | 12/2012 |
| DE | 102011084140 A1 | 4/2013 |
| JP | 2012-62851 A | 3/2012 |
| KR | 200407842 Y1 | 2/2006 |
| RU | 2361113 C2 | 7/2009 |
| WO | 03100249 A1 | 12/2003 |
| WO | 2005071261 A1 | 8/2005 |
| WO | 2007033671 A1 | 3/2007 |
| WO | 2012034566 A1 | 3/2012 |
| WO | 2013050569 A2 | 4/2013 |

* cited by examiner

METHOD FOR MOUNTING A WIND TURBINE ROTOR BLADE, AND WIND TURBINE ROTOR BLADE

BACKGROUND

Technical Field

The present invention relates to a method for mounting a wind turbine rotor blade, and to a wind turbine rotor blade.

Description of the Related Art

Modern wind turbines have a rotor, with typically three rotor blades, which is set in rotational movement by the wind. The rotational movement of the rotor is transmitted directly or indirectly to an electric generator which generates electrical energy.

DE 102 25 025 A1 discloses a device for handling rotor blades when the rotor blades are being mounted. The device takes the form of a carrying element in which the rotor blade can be laid so that the rotor blade can then be mounted by means of the carrying element. Furthermore, when mounting rotor blades of a wind turbine, auxiliary ropes typically need to be arranged on the carrying element or on the wind turbine in order to be able to stabilize or position the rotor blade when necessary during the mounting.

In the German application establishing priority, a search conducted by the German Patent and Trademark Office found the following documents: DE 20 2010 003 033 U1 and DE 10 2011 084 140 A1.

BRIEF SUMMARY

Embodiments of the invention provide an improved method for mounting wind turbine rotor blades, and a corresponding wind turbine rotor blade.

According to one embodiment, a method for mounting a wind turbine rotor blade which has at least one release unit is provided. A hoisting rope is fastened on or in the rotor blade. First ends of at least one auxiliary rope are fastened on or in the release unit in the rotor blade. The rotor blade is lifted up by means of the hoisting rope. The rotor blade is mounted on a rotor of the wind turbine. The release unit is activated so that the first ends of the auxiliary ropes are released. The auxiliary ropes can be removed.

According to one aspect of the present invention, the release units can be activated by means of release ropes from a rotor blade root area so that the first ends of the auxiliary ropes can be released.

According to a further aspect of the present invention, at least one securing rope is provided between the hoisting rope and the at least one auxiliary rope so that the auxiliary ropes are unable to fall down in an uncontrolled fashion.

The invention also relates to a wind turbine rotor blade with a rotor blade tip, a rotor blade root, at least one opening for an auxiliary rope and at least one release unit in the rotor blade for receiving a first end of the auxiliary rope. The release unit is designed so as to hold the first ends of the auxiliary ropes in a locked position, and to free the first ends of the auxiliary ropes in a release position.

According to one aspect of the present invention, release ropes are provided which extend from the release unit to the rotor blade root of the rotor blade and are designed to release the first ends of the auxiliary ropes.

According to one aspect of the present invention, one of the release units is arranged inside the rotor blade, 20%-30% of the blade length of the rotor blade away from the rotor blade tip.

One or more embodiments relate to a concept of fastening auxiliary ropes inside the rotor blade on a release unit, it being possible for the release unit inside the rotor blade to be activated, for example by means of a release rope, so that the auxiliary ropes no longer need to be fastened to the outside of the rotor blade. This is advantageous because it is thus no longer necessary for installation personnel to have to be lifted up to the mounted rotor blade, for example by means of a crane basket, in order to unfasten the auxiliary ropes attached to the outside.

An embodiment of the invention also relates to a wind turbine rotor blade with a rotor blade tip and a rotor blade root. Two openings for one auxiliary rope in each case are provided inside the rotor blade. The rotor blade also has at least two release units. One end of the auxiliary ropes is fastened in the release unit. After the rotor blade has been mounted securely on the rotor, the release units are activated and the first ends of the auxiliary ropes are released and can then be lowered down.

According to one aspect of the present invention, a securing rope can in each case be provided in the region of the first end of the auxiliary ropes so that the auxiliary ropes do not fall down in an uncontrolled fashion when the respective first ends of the auxiliary ropes have been released from the release unit.

According to a further aspect of the present invention, the release units have release ropes which lead to the rotor blade root area of the rotor blade so that the mounting personnel do not need to access the inside of the rotor blade in order to release the auxiliary ropes.

Further embodiments of the invention are the subject of the dependent claims.

BRIEF DESCRIPTION OF THE SEVERAL VIEWS OF THE DRAWINGS

Advantages and exemplary embodiments of the invention are explained in detail below with reference to the drawings.

DETAILED DESCRIPTION

Figure 1:
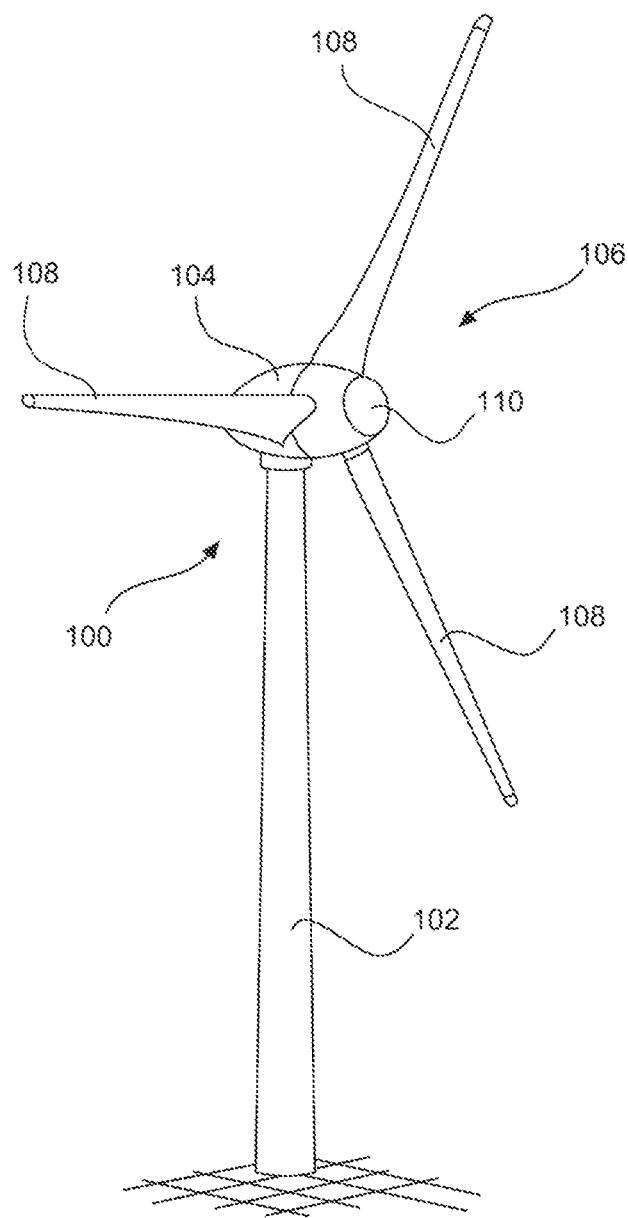
FIG. 1 shows a schematic view of a wind turbine according to the invention.

FIG. 1 shows a schematic view of a wind turbine according to the invention. The wind turbine 100 has a tower 102 and a nacelle 104 on top of the tower 102. An aerodynamic rotor 106 with three rotor blades 108 and a spinner 110 is provided on the nacelle 104. The aerodynamic rotor 106 is set in rotational movement by the wind when the wind turbine is operating and thus also rotates a rotor of a generator which is coupled directly or indirectly to the aerodynamic rotor 106. The electric generator is arranged in the nacelle 104 and generates electrical energy. The pitch angles of the rotor blades 108 can be modified by pitch motors on the rotor blade roots 108b of the respective rotor blades 108.

Figure 2:
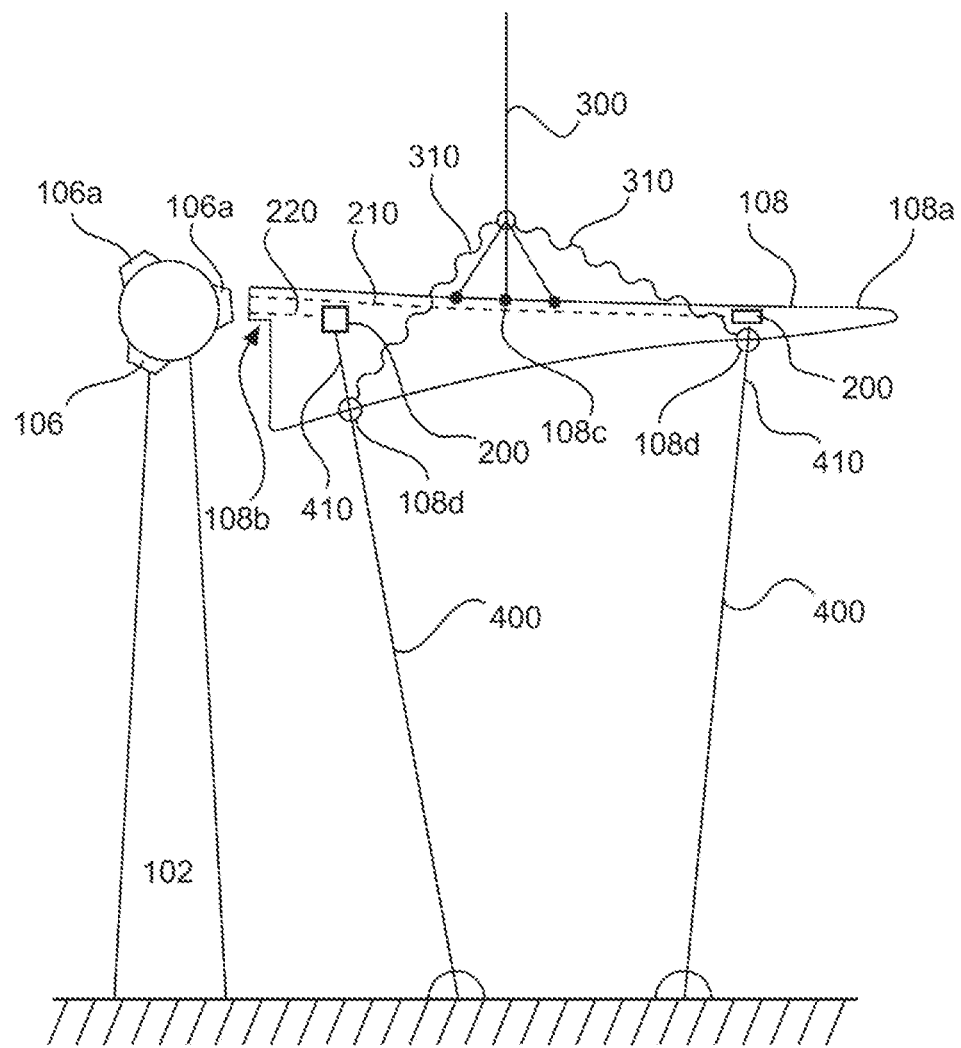
FIG. 2 shows a schematic view of a wind turbine during the mounting of a rotor blade according to a first exemplary embodiment, and FIGS. 3A and 3B each show a schematic view of a release unit according to a second exemplary embodiment of the invention.

FIG. 2 shows a schematic view of a wind turbine during the mounting of a rotor blade 108. Three blade adapters 106a, to which the rotor blades 108 are mounted, can be provided on the rotor 106. The rotor blades 108 can, however, also be mounted directly on a hub of the rotor 106.

The rotor blade 108 can be lifted up by means of a hoisting rope 300 by a crane (not shown). The hoisting ropes 300 can optionally be passed through openings 108c in the rotor blade and be fastened inside the rotor blades. The rotor blade 108 has a rotor blade tip 108a, a rotor blade root 108b and a rotor blade length. Two auxiliary ropes or retaining ropes 400 are, for example, provided in order to be able to stabilize the rotor blade 108 during the mounting. The rotor blade has two openings 108d through which first ends 410 of the auxiliary or retaining ropes 400 can be passed. The first ends 410 of the retaining ropes or auxiliary ropes 400 can then be fastened in or on a release unit 200 inside the rotor blade. Release ropes 210, 220 can lead from the release units 200 into the region of the rotor blade root 108b.

Securing ropes 310 can optionally be fastened between the hoisting rope 300 and the first ends 410 of the auxiliary ropes or retaining ropes 400. This is advantageous because the auxiliary ropes 400 are thus not able to fall or drop down unsecured.

The auxiliary or retaining ropes 400 serve to handle and/or secure the rotor blade during the mounting.

When the rotor blade 108 is mounted on the rotor blade adapter 106a or on the hub of the rotor 106, the release units 200 can then be activated, for example by activating the release ropes 210, 220, so that the first ends 410 of the auxiliary ropes or retaining ropes 400 are released. The first ends 410 of the auxiliary ropes or retaining ropes 400 can then be lowered through the openings 108d in the rotor blade. The securing ropes 310 can ensure that the auxiliary ropes 400 do not drop down unsecured.

Figure 3A:
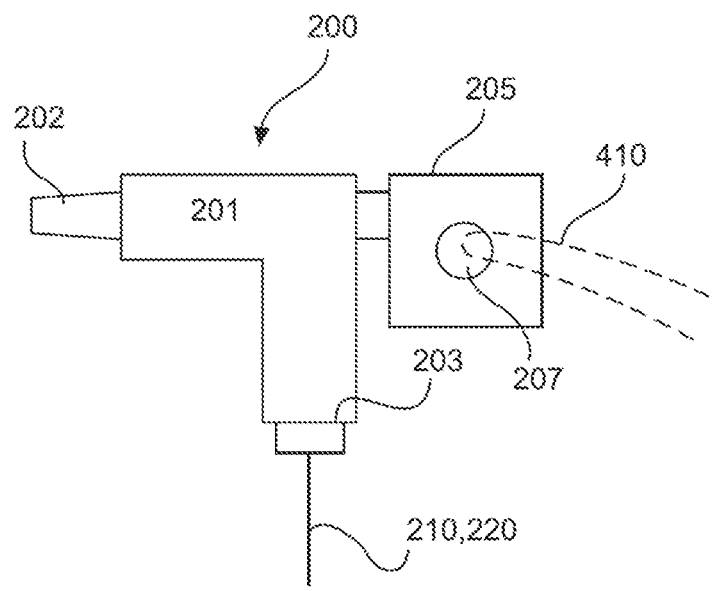
Figure 3B:
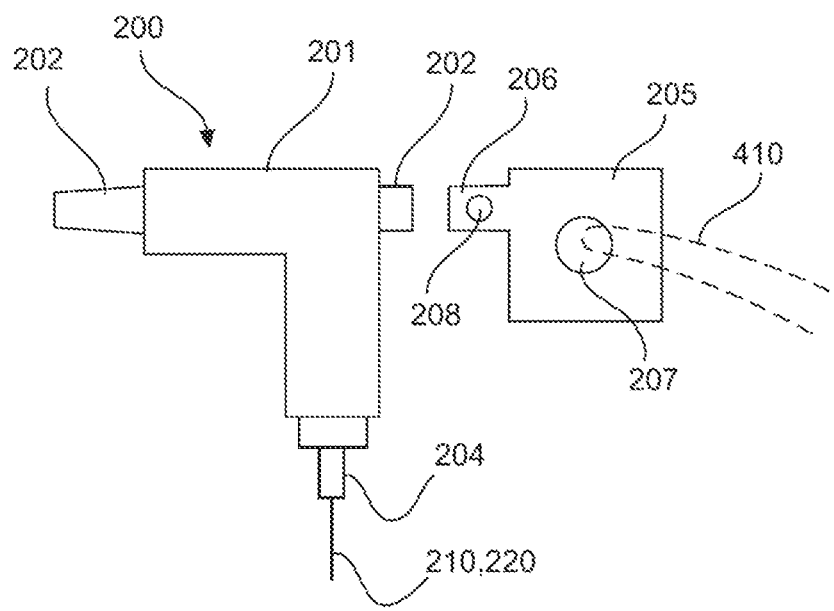

FIGS. 3A and 3B each show a schematic view of a release unit according to a second exemplary embodiment. The release unit 200 according to the second exemplary embodiment can be used as the release unit 200 according to the first exemplary embodiment. The release unit 200 has a central section 201 (which has, for example, an L-shaped design), a guide bar 202, a release end 203 with a securing bar 204 which can be fastened, for example, to one of the release ropes 210, 220. The release unit 200 furthermore has a release element 205 with a bore 207. The bore 207 serves to receive a first end 410 of an auxiliary rope 400. In a locked position, the release element 205 is retained in the central section 201 by the securing bar 204. When the release ropes 210, 220 are activated, the securing bar 204 is then drawn out of the end 203, and the bar 202 and the release element 205 are unlocked so that the release element 205 is released. The release element 205 has a first end 206 with a bore 208. In the locked state, the bar 204 is fastened in the bore 208 and thus retains the release element 205. When the bar 204 is drawn out of the bore 208 by activating the release ropes 210, 220, then the release element 205 with the first end 410 of the auxiliary rope 400 is released and the auxiliary rope 400 can be lowered or drop down.

The release unit serves to receive and retain one end of an auxiliary rope until the release unit is activated and the first end of the auxiliary rope is released. The release unit can be activated by means of the release ropes 210, 220 electrically, manually (by hand) and/or hydraulically.

The invention claimed is:

1. A method for mounting a wind turbine rotor blade to a rotor of a wind turbine, the method comprising:
    fastening a hoisting rope to the rotor blade;
    fastening a first end of at least one auxiliary rope or retaining rope to a release unit located in the rotor blade;
    lifting up the rotor blade by the hoisting rope;
    mounting the rotor blade on the rotor of the wind turbine;
    activating the release unit so that the first end of the at least one auxiliary rope or retaining rope is release; and
    removing the auxiliary ropes or retaining ropes.

2. The method according to claim 1, wherein the release unit is activated from a rotor blade root area by a release rope so that the first end of the auxiliary rope or retaining rope is released.

3. The method according to claim 1, wherein at least one securing rope is provided between the hoisting rope and the at least one auxiliary rope or retaining rope that prevents the at least one auxiliary rope or retaining rope from falling down in an uncontrolled fashion.

4. A wind turbine comprising:
    at least one wind turbine rotor blade that has been mounted to the wind turbine according to the method for mounting a wind turbine rotor blade according to claim 1.

5. The method according to claim 1, wherein fastening the hoisting rope comprises fastening the hosting rope inside of the rotor blade.

6. The method according to claim 1, wherein fastening the first end of at least one auxiliary rope or retaining rope comprises fastening the first ends of a plurality of auxiliary ropes or retaining ropes to release units located in the rotor blade.

7. A wind turbine rotor blade, comprising:
    a rotor blade tip,
    a rotor blade root,
    at least one opening for receiving an auxiliary rope or retaining rope, and
    at least one release unit in the rotor blade for receiving a first end of the auxiliary rope, wherein the release unit is configured to:
        retain the first end of the auxiliary rope or retaining rope in a locked position, and
        free the first end of the auxiliary rope or retaining rope in a release position.

8. The wind turbine rotor blade according to claim 7, further comprising:
    release ropes that extend from the release unit to the rotor blade root, the release ropes being configured to release the first end of the auxiliary rope or retaining rope.

9. The wind turbine rotor blade according to claim 7, wherein the at least one release unit is arranged inside the rotor blade at a location of between 20%-30% of a length of the rotor blade starting from the rotor blade tip.

10. A wind turbine comprising:
    at least one wind turbine rotor blade according to claim 7.

* * * * *